United States Patent
Shin et al.

(10) Patent No.: US 12,073,028 B2
(45) Date of Patent: Aug. 27, 2024

(54) HAND GESTURE RECOGNITION BASED ON DETECTED WRIST MUSCULAR MOVEMENTS

(71) Applicant: GOOGLE LLC, Mountain View, CA (US)

(72) Inventors: Dongeek Shin, San Jose, CA (US); Shahram Izadi, Tiburon, CA (US); David Kim, Zug (CH); Sofien Bouaziz, Los Gatos, CA (US); Steven Benjamin Goldberg, Los Altos Hills, CA (US); Ivan Poupyrev, Los Altos, CA (US); Shwetak N. Patel, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/174,358

(22) Filed: Feb. 24, 2023

(65) Prior Publication Data
US 2023/0393665 A1 Dec. 7, 2023

Related U.S. Application Data

(63) Continuation of application No. 17/249,966, filed on Mar. 19, 2021, now Pat. No. 11,592,908.

(51) Int. Cl.
G06F 3/01 (2006.01)
G06F 1/16 (2006.01)
G06V 40/20 (2022.01)

(52) U.S. Cl.
CPC .............. G06F 3/017 (2013.01); G06F 1/163 (2013.01); G06F 3/014 (2013.01); G06V 40/28 (2022.01)

(58) Field of Classification Search
CPC .......... G06F 3/017; G06F 1/163; G06F 3/014; G06V 40/28
See application file for complete search history.

(56) References Cited

U.S. PATENT DOCUMENTS 10,503,883 B1   12/2019   Gillian et al.
2016/0228010 A1   8/2016   Kim et al.
(Continued)

FOREIGN PATENT DOCUMENTS

CN          111461037 A         7/2020

OTHER PUBLICATIONS

Lu , et al., "Microwave Noncontact Measurement of Pulse Wave Velocity for Healthcare Applications", retrieved from: https://www.researchgate.netpublication/224136875_Microwave_noncontact_measurement_of_pulse_wave_velocity_for_healthcare_applications, May 2010.

*Primary Examiner* — Matthew A Eason
*Assistant Examiner* — Chayce R Bibbee
(74) *Attorney, Agent, or Firm* — Brake Hughes Bellermann LLP

(57) ABSTRACT

Techniques of identifying gestures include detecting and classifying inner-wrist muscle motions at a user's wrist using micron-resolution radar sensors. For example, a user of an AR system may wear a band around their wrist. When the user makes a gesture to manipulate a virtual object in the AR system as seen in a head-mounted display (HMD), muscles and ligaments in the user's wrist make small movements on the order of 1-3 mm. The band contains a small radar device that has a transmitter and a number of receivers (e.g., three) of electromagnetic (EM) radiation on a chip (e.g., a Soli chip). This radiation reflects off the wrist muscles and ligaments and is received by the receivers on the chip in the band. The received reflected signal, or signal samples, are then sent to processing circuitry for classification to identify the wrist movement as a gesture.

20 Claims, 7 Drawing Sheets

(56) References Cited

U.S. PATENT DOCUMENTS

| | | |
|---|---|---|
| 2018/0157330 A1 | 6/2018 | Gu et al. |
| 2018/0253151 A1* | 9/2018 | Kletsov .................. A61B 5/004 |
| 2019/0034714 A1 | 1/2019 | Barth et al. |
| 2019/0219687 A1 | 7/2019 | Baheti et al. |
| 2020/0026360 A1 | 1/2020 | Baheti et al. |

* cited by examiner

400

```
┌─────────────────────────────────────┐
│  Receive reflected electromagnetic   │
│  radiation from a set of receiving   │
│  antennae, each of the set of        │
│  receiving antennae being configured │
│  to receive reflected electromagnetic│
│  radiation reflected from a portion  │
│  of an arm of a user in response to  │
│  transmitted electromagnetic         │
│  radiation being incident on the     │
│  portion of the arm from a           │
│  transmitting antenna                │
│                                 402  │
└─────────────────────────────────────┘
                    │
                    ▼
┌─────────────────────────────────────┐
│  Perform a classification operation  │
│  on the reflected electromagnetic    │
│  radiation to produce a              │
│  classification result, the          │
│  classification result indicating a  │
│  gesture performed by the user as    │
│  the electromagnetic radiation is    │
│  incident on the portion of the arm  │
│                                 404  │
└─────────────────────────────────────┘
```

FIG. 4

HAND GESTURE RECOGNITION BASED ON DETECTED WRIST MUSCULAR MOVEMENTS

CROSS REFERENCE TO RELATED APPLICATION

This application is a continuation of U.S. application Ser. No. 17/249,966, filed Mar. 19, 2021, the disclosure of which is incorporated herein by reference in its entirety.

TECHNICAL FIELD

This description relates to recognition of hand gestures used in applications such as augmented reality (AR) or virtual reality (VR) systems based on a detection of small muscular movements of the wrist.

BACKGROUND

Some augmented and virtual reality systems interpret gestures from users as commands for interacting with virtual objects. Along these lines, transmitters and receivers of electromagnetic radiation used in some augmented and virtual reality systems can track movements of hand, arm, wrist, or other body parts that form gestures. These movements may be represented to a processor running an augmented or virtual reality system as waveforms generated by a receiver in response to receiving radiation from the transmitter and reflected off the body parts.

SUMMARY

In one general aspect, a method can include receiving reflected electromagnetic radiation from a set of receiving antennae, each of the set of receiving antennae being configured to receive reflected electromagnetic radiation reflected from a portion of an arm of a user in response to the transmitted electromagnetic radiation being incident on the portion of the arm from a transmitting antenna. The method can also include performing a classification operation on the reflected electromagnetic radiation to produce a classification result, the classification result indicating a gesture performed by the user as the electromagnetic radiation is incident on the portion of the arm.

In another general aspect, a computer program product comprising a nontransitive storage medium, the computer program product including code that, when executed by processing circuitry of a computing device, causes the processing circuitry to perform a method. The method can include receiving reflected electromagnetic radiation from a set of receiving antennae, each of the set of receiving antennae being configured to receive reflected electromagnetic radiation reflected from a portion of an arm of a user in response to the transmitted electromagnetic radiation being incident on the portion of the arm from a transmitting antenna. The method can also include performing a classification operation on the reflected electromagnetic radiation to produce a classification result, the classification result indicating a gesture performed by the user as the electromagnetic radiation is incident on the portion of the arm.

In another general aspect, a system comprises a wearable device configured to be worn along a portion of an arm of a user, the wearable device including a transmitting antenna configured to transmit a pulse of transmitted electromagnetic radiation toward the portion of the arm; and a set of receiving antennae configured to receive reflected electromagnetic radiation reflected from the portion of the arm in response to the transmitted electromagnetic radiation being incident on the portion of the arm. The reflected electromagnetic radiation indicates a gesture performed by the user as the electromagnetic radiation is incident on the interior of the wrist in response to a classification operation being performed on the reflected electromagnetic radiation.

The details of one or more implementations are set forth in the accompanying drawings and the description below. Other features will be apparent from the description and drawings, and from the claims.

BRIEF DESCRIPTION OF THE DRAWINGS

FIG. 4 is a flow chart that illustrates an example process for calibrating microphones of a microphone array according to the technical solution.

DETAILED DESCRIPTION

Figure 1A:
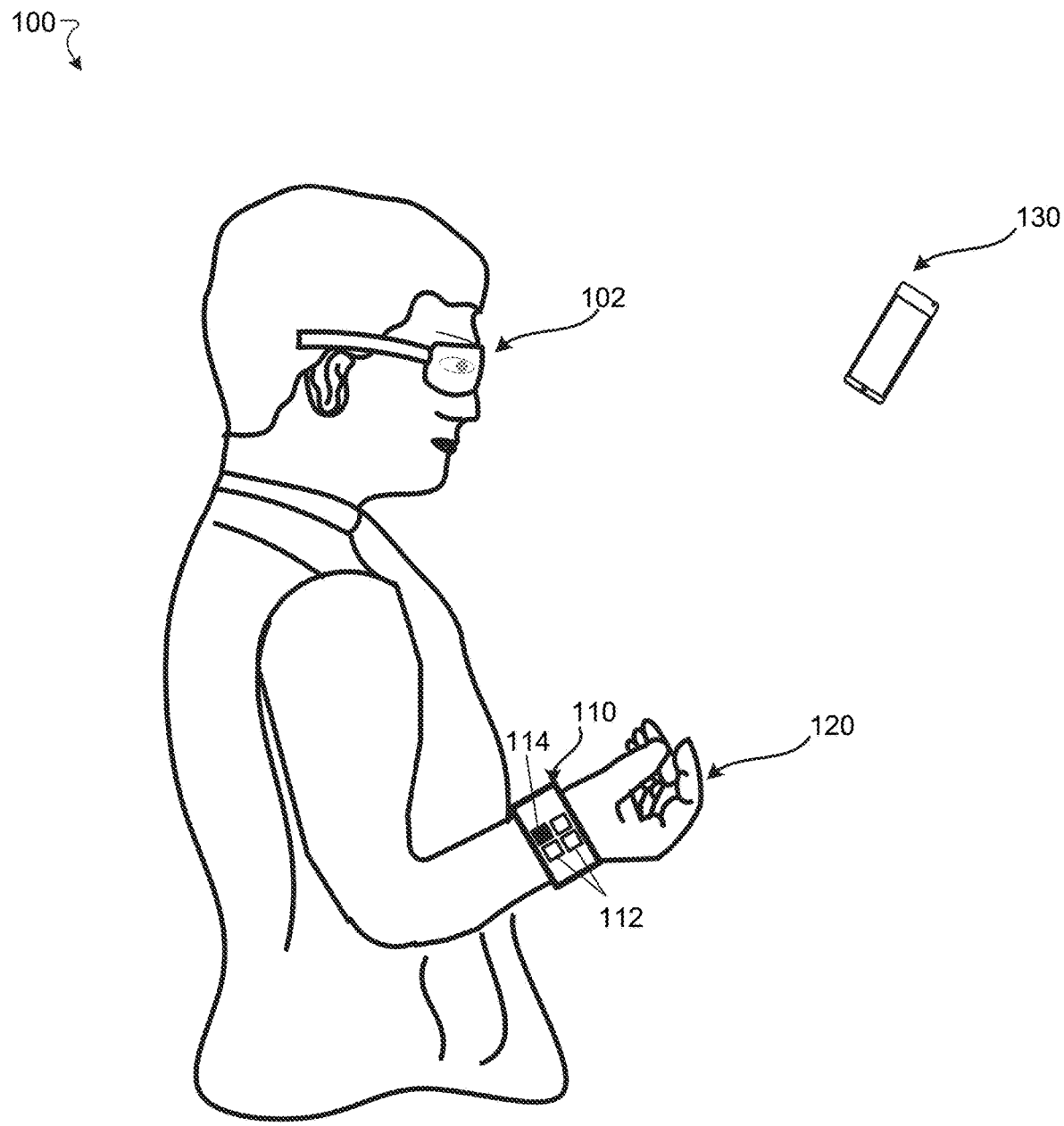
FIG. 1A is a diagram that illustrates an example scenario involving a user of an AR system using a wristband for detecting small wrist muscle movements.

Examples of transmitters used in conventional augmented and virtual reality systems include wearable devices and electromyograms (EMGs). Wearable devices include objects such as smartrings worn over a finger or smartwatches worn over a wrist. These wearable devices, in some implementations, broadcast signals to receivers in HMDs or mobile device controllers that indicate gestures. EMGs transmit electrical activity in muscles, e.g., arm muscles, to indicate such gestures.

The above-described transmitters in conventional augmented and virtual reality systems suffer from a number of technical problems. For example, wearable devices tend to be bulky and uncomfortable, which can interfere with the users' experiences. Further, EMGs also require bulky devices worn on an arm that are cumbersome to calibrate and can be too sensitive to contact. In addition, such conventional systems may expose a user's personally identifiable information (PII) and use an excessive amount of system power.

In contrast to the conventional approaches to solving the above-described technical problems, a technical solution to the above-described technical problems includes detecting and classifying inner-wrist muscle motions at a user's wrist using micron-resolution radar sensors. For example, a user of an AR system may wear a band around their wrist. When the user makes a gesture to manipulate a virtual object in the AR system as seen in a head-mounted display (HMD), muscles and ligaments in the user's wrist make small movements on the order of 1-3 mm. The band contains a small radar device that has a transmitter and a number of receivers (e.g., three) of electromagnetic (EM) radiation on a chip (e.g., a Soli chip); this chip is a small distance from the wrist. The EM radiation is a small wavelength such as millimeter wave so that such small movements are detectable. Moreover, the EM radiation is emitted as chirped frequency-modulated continuous wave (FMCW) in bursts each of about 30 chirps having a beginning frequency of about 60 GHz and a bandwidth of about 4.5 GHz. This radiation reflects off the wrist muscles and ligaments and is received by the receivers on the chip in the band. The received reflected signal, or signal samples, are then sent to processing circuitry for classification to identify the wrist movement as a gesture. The AR system, having identified the gesture, then performs a virtual object manipulation operation to manipulate a virtual object based on the gesture.

A technical advantage of the above-described technical solution is that the technical solution results in an AR or VR experience that is comfortable due to its small size. The above-described technical solution is also privacy preserving because signals generated from small wrist movements do not contain any PII. Further, the above-described technical solution uses very low levels of power (e.g., 1-3 milliwatts).

In some implementations, the processing circuitry splits the raw signal samples into background and foreground components. In such an implementation, the processing circuitry is configured to determine whether the wrist band is present based on the background component. In some implementations, in response to the determination that the wrist band is present, the processing circuitry caries out a classification operation on the foreground component. In some implementations, the classification operation is performed using a convolutional neural network (CNN). In some implementations, the determination of whether the wrist band is present based on the background component is performed by another CNN.

FIG. 1A is a diagram that illustrates an example scenario involving a user 100 of an AR system with a HMD 102 in the form of smart glasses. The user 100 controls interactions with virtual objects that appear on the HMD 102 using a wristband 110 and a mobile device 130. The mobile device 130, in conjunction with the wristband 110, controls the interactions with the virtual objects by detecting a gesture 120 made by the user 100. Examples of gestures include, but are not limited to, swiping of a thumb or finger, movement of a hand in a specific direction, movement of a finger against another finger on the same hand, movement of a finger against a finger on another hand, and so on. In some implementations, processing circuitry of the mobile device 130 for detecting the gesture 120 is embedded in the wristband 110.

The mobile device 130 detects the gesture 120 using signals generated by the wristband in response to movements of the user's wrist in forming the gesture 120. To generate the signals, the wristband has a transmitting antenna 114 embedded inside. The transmitting antenna 114 generates and transmits bursts of electromagnetic radiation toward the user's wrist. The radiation reflects off various objects, including the skin/band interface and various wrist muscles and ligaments to form reflected electromagnetic radiation. Receiving antennae 112 subsequently receive the reflected electromagnetic radiation and transmits samples of the received radiation to the processing circuitry of the mobile device 130.

In some implementations, the processing circuitry is embedded in the wristband 110. Further details about the reflected radiation are provided in FIG. 1B.

Figure 1B:
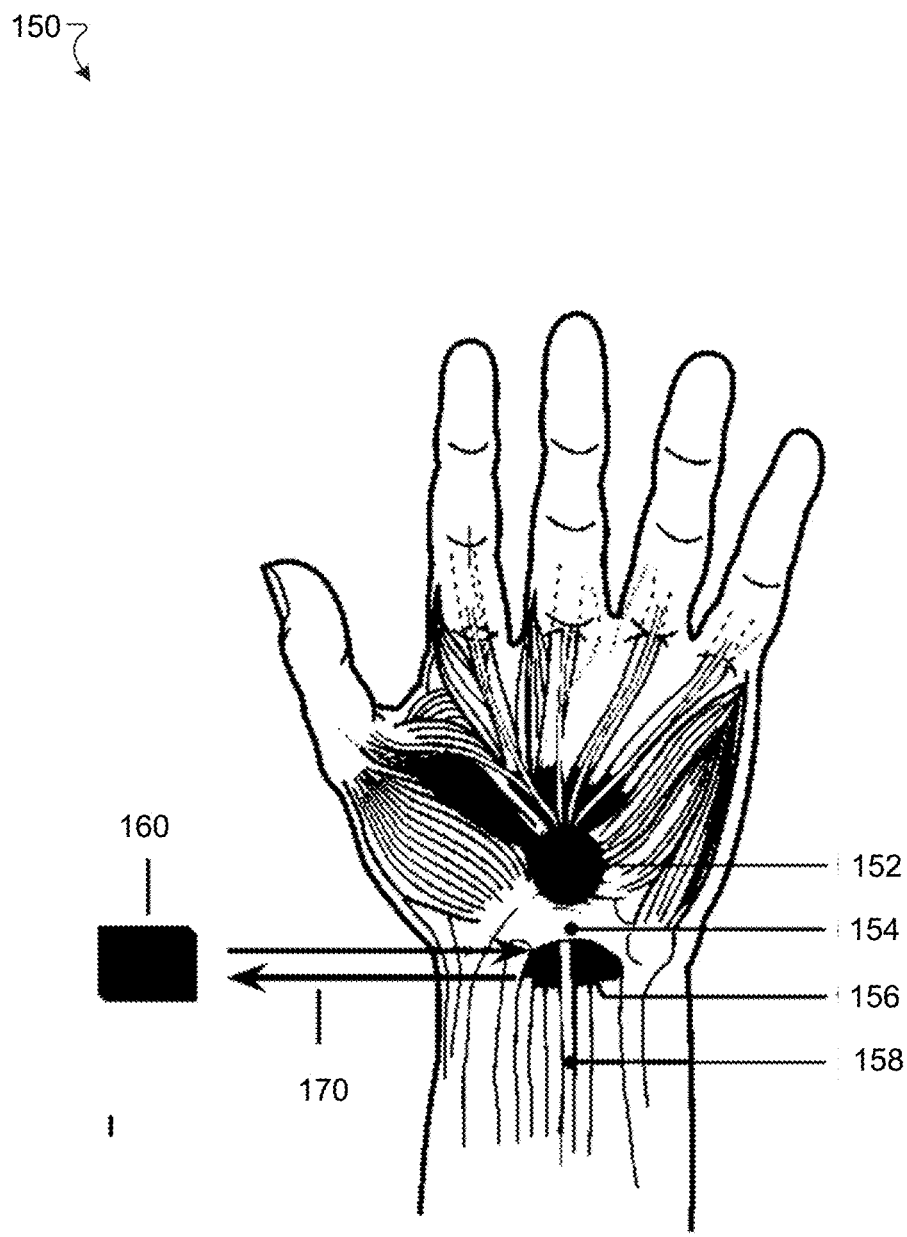
FIG. 1B is a diagram that illustrates an example configuration of a FMCW radar interacting with a human wrist.

FIG. 1B is a diagram that illustrates an example configuration 150 of a FMCW radar 160 interacting with a human wrist. The wrist and proximate components include a compressed nerve 152, a carpal ligament 154, a carpal tunnel 156, and a median nerve 158. The radar 160 may correspond to the transmitting and receiving antennae 112 and 114 in FIG. 1A and the distance radiation bursts 170 travel between the radar 160 and the wrist is exaggerated in FIG. 1B for clarity.

The FMCW radar 160 transmits bursts to the wrist at a specified rate (e.g., 30 Hz). When the user does not move to form a gesture, the signal reflected from the above-cited wrist components 152, 154, 156, and 158 remain largely in place and the receiving antennae in the radar do not receive any significant change to the reflected signal. When a user begins to move their hand to form a gesture, however, these components 152, 154, 156, and 158 move slightly. When the wavelength of the radiation is sufficiently small, the reflected radiation can provide sufficient resolution of the movement for detection by processing circuitry (e.g., processing circuitry of mobile device 130). It is noted that the reflected signal as received by a receiving antenna (e.g., receiving antennae 112) may include signals reflected by the skin/wristband interface or multiply reflected signals within the wrist.

Accordingly, in some implementations, the radiation transmitted from the transmitting antenna 114 includes millimeter wave (mmWave) signals. mmWave radiation has frequencies between about 50 GHz to about 90 GHz. An advantage of mmWave radiation is that radar phase resolution is proportional to the center frequency of operation. A reason for this is that phase wrapping of a down-mixed sinusoidal signal repeats each half-wavelength. That is, if the spatial representation of the signal is given by s(R), where s is the complex signal amplitude and R a position along the direction of propagation, then the following relation holds:

$$\arg[s(R)] = \arg\left[s\left(R + \frac{\lambda}{2}\right)\right],$$

where $\lambda$ is the wavelength of the radiation and arg represents the argument, or phase, of the complex signal amplitude.

For example, in a case where the center frequency of the transmitted radiation is 60 GHz, a phase-wrapping displacement is 2.5 mm. In some implementations, each burst of radiation includes a specified number (e.g., 30) chirps. That is, 30 cycles in which the frequency of the radiation increases between a beginning frequency and an ending frequency. For a moderate sampling scheme, there may be 128 samples per chirp. In this case, the phase-resolved distance—that is, the size of the wrist muscle movement resolvable by the radiation—is equal to a ratio of the phase-wrapping displacement to the number of samples per chirp, or about 0.019 mm. This is sufficient to detect small wrist movements as the user forms a gesture.

An additional advantage of using mmWave radiation to detect wrist movements in forming gestures is non intrusiveness in form factor. That is, if there is sufficient accuracy, then the circuitry in the wristband will not become bulkier or otherwise altered significantly. A chip on which the receiving and transmitting antennae are disposed can also be hidden inside silicone or any conventional band material without any significant degradation in signal-to-noise ratio (SNR).

Another advantage of using mmWave radiation is its relatively low power. Sufficient SNR and accuracy in identifying gestures may be achieved using less than 10 mW of power in the transmitting antenna. In some implementations, the transmitting antenna uses 1-3 mW of power.

Moreover, the mmWave frequency domain has been used in more general wireless communications such as 5G new radio (NR) technology. Accordingly, the receiving and transmitting technology within this frequency band is robust and mature. mmWave technology is configured to be sensitive enough to detect wrist muscle motion; nevertheless, mmWave wavelengths are large enough to avoid excessive noise. There is also a constant level of signal fidelity, so that wrist movements as opposed to noise are identified. Moreover, by using mmWave frequency bands, regulatory issues are avoided. Further details about the mmWave radar configuration as used in the above-described technical solution is described with regard to FIG. 1C.

Figure 1C:
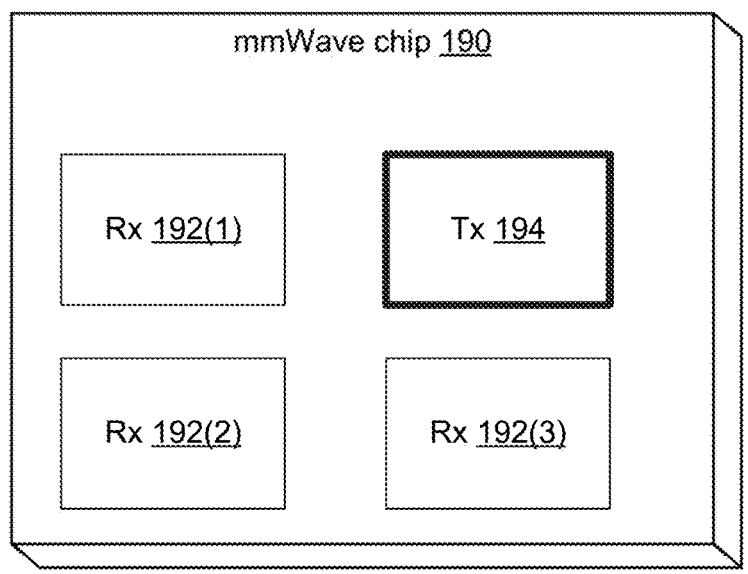
FIG. 1C is a diagram that illustrates an example mmWave radar on a chip.

FIG. 1C is a diagram that illustrates an example mmWave radar on a chip 190. An example of such a radar on a chip is a Soli C chip. As shown in FIG. 1C, the mmWave radar on a chip 190 includes a transmitting (Tx) antenna 194 and three receiving (Rx) antennae 192(1, 2, 3). In some implementations, there are more than three Rx antennae (e.g., four, five, and so on). Because the Rx antennae 192(1-3) are disposed on different locations of the chip 190, the radiation these Rx antennae 192(1-3) receive are incident at different angles. It has been demonstrated that three antennae provide sufficient accuracy in identifying a gesture. In some implementations, the signals received at the Rx antennae 192(1-3) are averaged together at the processing circuitry (e.g., mobile device 130). In some implementations, the averaging is weighted to favor or penalize a particular Rx antenna.

In some implementations, the chip 190 is embedded in a wrist band made from a photoplethysmographic (PPG) material. Such a material provides mechanical support for the chip to stay effectively fixed near, but away from, the wrist. In some implementations, further insulation such as double-sided tape can ensure a low-pressure contact between the wristband and the wrist. The dimensions of the chip 190 are such that the chip 190 may fit into a wristband; in some implementations, dimensions are about 6.5 mm long by 5.0 mm wide by 0.8 mm thick. Other dimensions that fit into other mechanical supports may be used.

Figure 2:
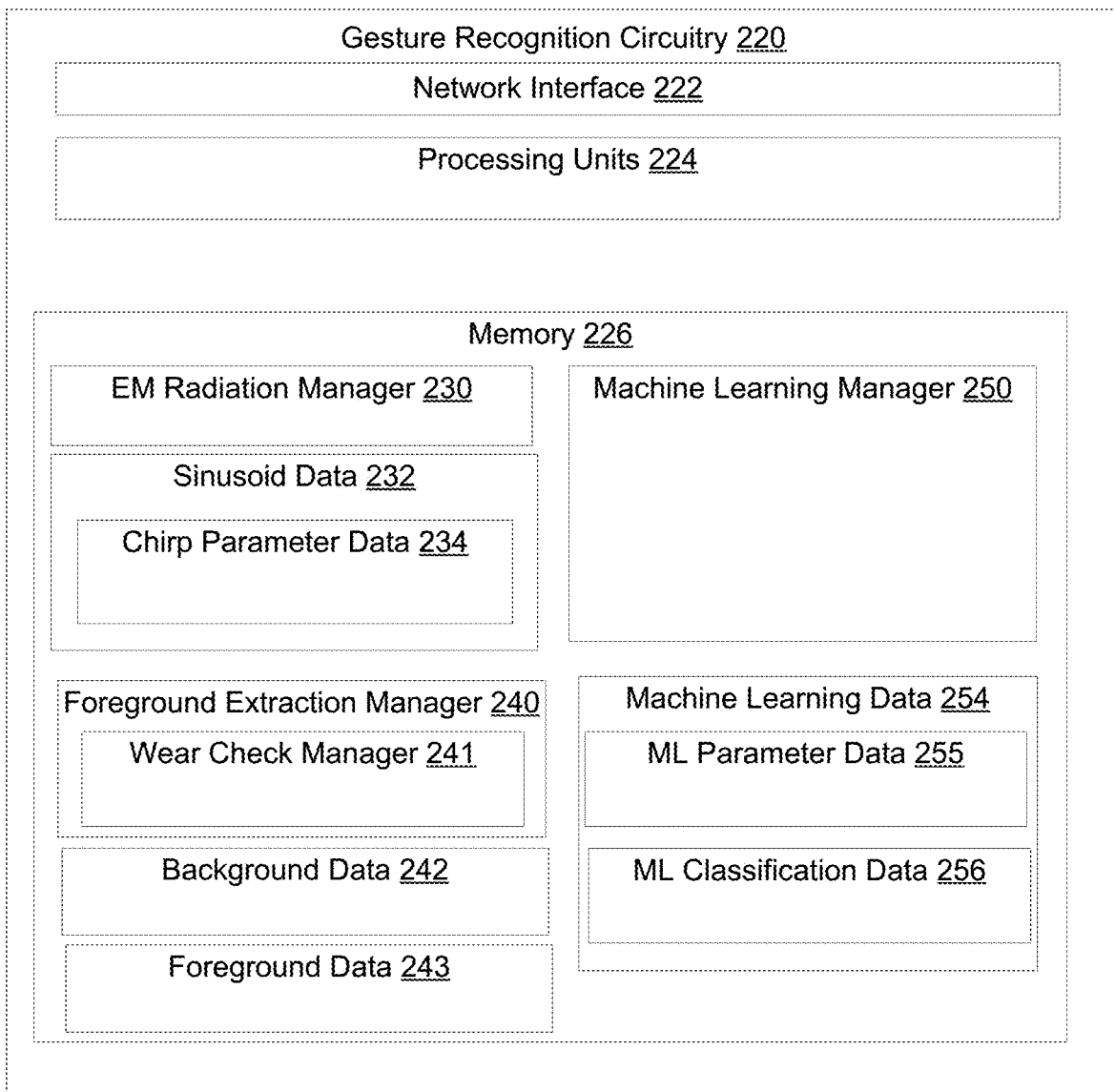
FIG. 2 is a diagram that illustrates an example electronic environment for implementing the technical solution described herein.

FIGS. 1A through 1C describe the generation of signals used to determine gestures. FIGS. 2 and 4, describe aspects of the technical solution that process the raw data from the Rx antennae to identify a gesture.

FIG. 2 is a diagram that illustrates an example electronic environment 200 in which the above-described improved techniques may be implemented. As shown in FIG. 2, the example electronic environment 200 includes gesture recognition circuitry 220.

The gesture recognition circuitry 220 includes a network interface 222, one or more processing units 224, and memory 226. The network interface 222 includes, for example, Ethernet adaptors, and the like, for converting electronic and/or optical signals received from a network to electronic form for use by the gesture recognition circuitry 220. The set of processing units 224 include one or more processing chips and/or assemblies. The memory 226 includes both volatile memory (e.g., RAM) and non-volatile memory, such as one or more ROMs, disk drives, solid state drives, and the like. The set of processing units 224 and the memory 226 together form control circuitry, which is configured and arranged to carry out various methods and functions as described herein.

In some embodiments, one or more of the components of the gesture recognition circuitry 220 can include processors (e.g., processing units 224) configured to process instructions stored in the memory 226. Examples of such instructions as depicted in FIG. 2 include an EM radiation detection manager 230, a machine learning manager 240, and a foreground extraction manager 250. Further, as illustrated in FIG. 2, the memory 226 is configured to store various data, which is described with respect to the respective managers that use such data.

The EM radiation manager 230 is configured to obtain sinusoid data 232 based on received EM radiation intensity and phase values. In some implementations, the EM radiation intensity and phase values are received over a wireless connection through the air, as in, for example, a wireless connection between a Soli C chip (e.g., chip 190) and the gesture recognition processing circuitry 220. In some implementations, the circuitry 220 is embedded in a mobile device (e.g., mobile device 130 of FIG. 1A). In some implementations, the EM radiation intensity and phase values are received over a connection between a chip (e.g., chip 190) and another chip embedded in the wristband that includes the processing circuitry 220.

The sinusoid data 232 represents received EM radiation intensity values. These values take the form of samples at instants of time for each Rx antenna. In some implementations, the EM radiation manager 230 averages the values over Rx antennae. The sinusoid data 232 is packaged in bursts of a duration specified by a burst rate. In some implementations, each Rx antenna forms its own channel for a separate analysis. As shown in FIG. 2, the sinusoid data 232 includes chirp parameter data 234.

The chirp parameter data 234 represents values of the chirped signal that defines the sinusoid data 232. Such parameters include burst rate, chips per burst, number of channels, beginning and ending frequencies per chirp, frame size, and gain. In some implementations, the burst rate is about 30 per second. Each burst includes a number of chirps, i.e., a cycle of linearly increasing frequency from a beginning frequency to an ending frequency. In some implementations, there are 30 chirp cycles per burst. Accordingly, in such an implementation, a frequency profile of the received EM radiation of a single burst forms a sawtooth pattern for 30 cycles. For example, a beginning frequency of a chirp cycle is 58.5 GHz and the ending frequency of the chirp cycle is 63.0 GHz. As received by the gesture recognition circuitry 220, there are three channels of EM radiation intensity values, one for each Rx antenna. Accordingly, within each burst there are a triplet of chirps; such a triplet (or multiplet when there are more than three Rx antennae) forms a frame of data. Each chirp has a specified number of sample points in time defining a frame size; an example frame size would be 128, although other frame sizes may be used.

For an ideal point source, a received chirp is a single sinusoid with its frequency and phase values dependent on a distance from an Rx antenna to that point source. Because FMCW radar observations are linear, the gesture recognition circuitry 220 receives as raw chirp data then may be represented as an infinite sum of sinusoids with varying frequency and phase. For example, consider a single sinusoidal signal, $s_T(f, x) = A\, e^{j2\pi fx/c}$ transmitted toward K targets, where A is the signal amplitude, f is the signal frequency, x is a distance from a transmitter of the signal, and c is the speed of light. Then the signal reflected back is represented by the expression $$s_R(f, x) = \sum_{k=1}^{K} A\alpha_k \gamma_k e^{i\phi_k} e^{i2\pi f(2d_k - x)/c},$$

where $\gamma_k$ and $\varphi_k$ represent amplitudes and phases, respectively, of a reflection coefficient of the kth target, $\alpha_k$ represents a transmission loss coefficient from the kth target, and $d_k$ is a distance between the transmitter and the kth target. Note that, when the targets represent infinitesimal wrist skin patches, the number of targets K may be taken to infinity.

The values represented by the chirp parameter data 234 cited in the example above were selected for a vitals sensing projects which fine-grains range in stand-off distances; accordingly, one may optimize a configuration for a specific wrist sensing application which needs to fine-grain range in very close distances. In some implementations, another tuning would be the gain, as direct reflections from the wrist can saturate chirps. In such a scenario, it is advantageous to reduce gain to a point where saturation is minimized while satisfactory SNR is maintained.

The foreground extraction manager 240 is configured to produce separate background data 242 and foreground data 243 representing, respectively, background and foreground components of the sinusoid data 232. The separation of the sinusoid data 232 into background and foreground components allows a classifier (e.g., machine learning manager 250) to not only identify a gesture accurately but also to filter out cases in which a wrist band is not activated or even present and the received EM radiation data is simply noise. To effect such a filter, as shown in FIG. 2, the foreground extraction manager 240 includes a wear check manager 241.

The wear check manager 241 is configured to analyze the background data 242 and determine, based on the background data 242, whether there is an active user generating the received EM radiation data or whether that data is simply noise and not from a user forming a gesture. The wear check manager 241 is further configured to stop the process of identifying a gesture in the case of a determination there is no activated antennae based on the background data 241.

In an example flow, a raw waterfall (i.e., a time series of sinusoid data 242) is buffered in memory 226 (e.g., about 0.3 seconds) and is passed to the foreground extraction manager 240. The foreground data 243 represents moving parts of the wrist while the background data 242 represents static parts of the wrist. In some implementations, the background data 242 could also be used to check whether the antennae are activated, or even if the user is wearing the wristband. Once it is determined that the user is wearing the wristband, the foreground data 243 is passed to the machine learning manager 250. In some implementations, a backreflected radio frequency (RF) signal from a non-moving wrist is considered a background signal. When a user moves their wrist through a click gesture, the backreflected RF signal is a combination of background (i.e., baseline reflections) and foreground (i.e., sudden temporal fluctuations) components; the separation is performed to focus on the temporal fluctuations as the baseline contains no information about a gesture such as a click More detail regarding process flow for identifying a gesture is described in FIG. 4.

The machine learning manager 250 is configured to perform classification operations on the foreground data to produce machine learning data 254 representing a classification result identifying a particular gesture. In some implementations, the machine learning manager 250 takes as input the foreground data 243. In some implementations, the machine learning manager only activates upon the wear check manager 241 indicating that a user wearing a wristband has generated the sinusoid data 242.

In some implementations, the machine learning manager 250 includes a convolutional neural network (CNN). In some implementations, the CNN is trained offline before usage by the user. In some implementations, the training produces a number of CNN parameters represented by ML parameter data 255. The CNN parameters include weights at intermediate layers of the CNN determined from the training. In some implementations, the CNN includes two convolutional layers and one hidden layer. In some implementations, there are between 10,000 and 30,000 parameters.

In some implementations, the wear check manager 241 uses machine learning to determine whether background data 242 was generated from a user or simply represents noise. In some implementations, the machine learning takes the form of a convolutional neural network (CNN). In an example, a little CNN with two convolutional layers and one hidden layer may be sufficient to perform the wear check. Such a CNN may be trained offline and has 20,000 parameters.

The machine learning data 245 also includes ML classification data 256 which represents an identifier of a particular gesture as determined from the foreground data 243. In some implementations, the machine learning manager 250 is a binary classifier. The training of the classifier, unsupervised or supervised, results in a mapping of foreground data 243 to a gesture. Gestures may be represented by ML classification data 256 as a numeric identifier, an alphanumeric identifier, a visual identifier, an audio identifier, or the like.

Figure 3:
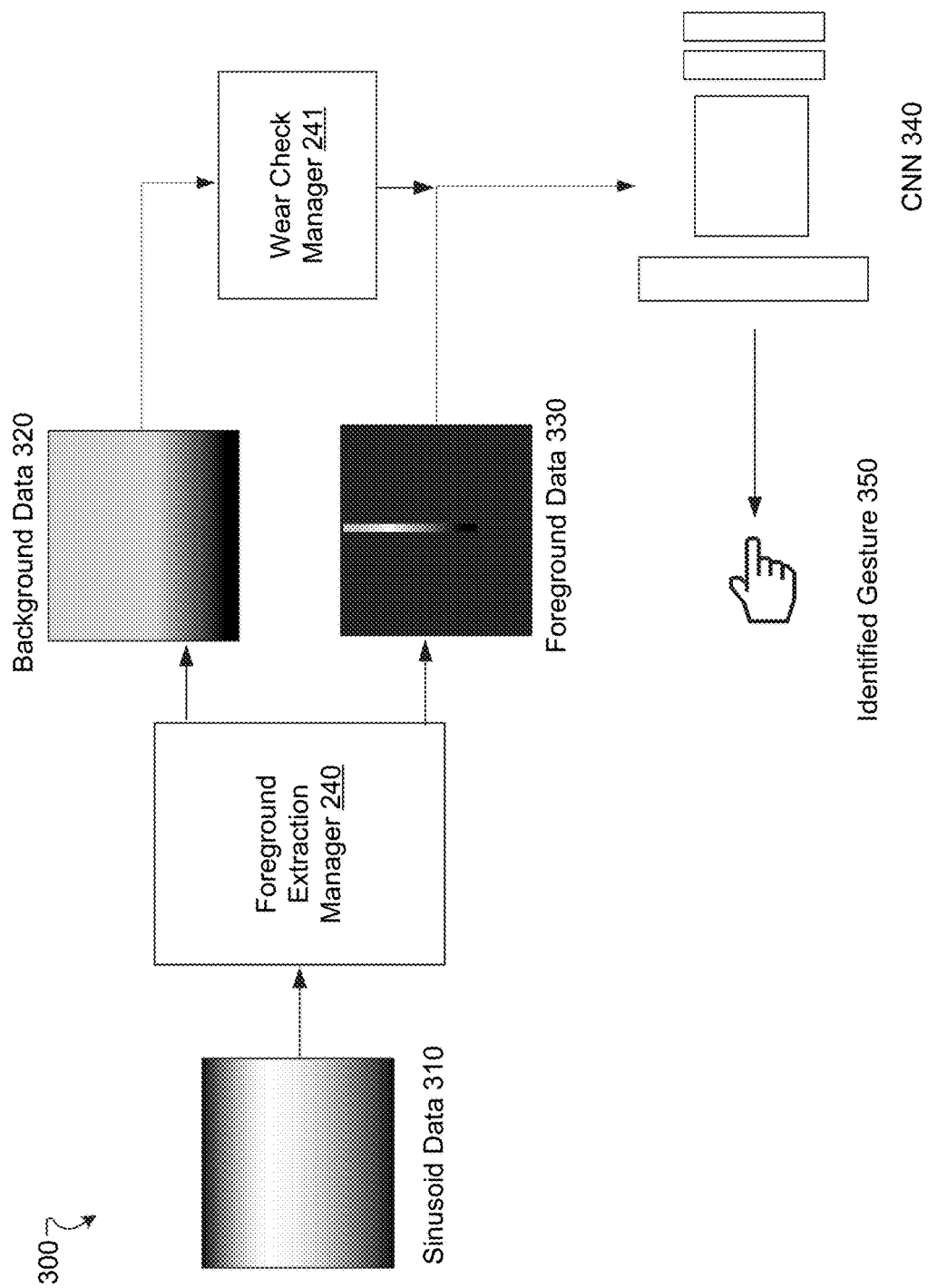
FIG. 3 is a block diagram that illustrates an example system for classifying foreground components of signals as gestures within the electronic environment shown in FIG. 2.

FIG. 3 is a block diagram that illustrates an example process flow 300 for classifying foreground components of signals as gestures.

To begin, the EM radiation manager 230 obtains sinusoid data 310 from received EM radiation over three or more channels corresponding to Rx antennae from a radar chip. As represented in FIG. 3, the sinusoid data 310 takes the form of waterfall data that is buffered in memory (e.g., 0.3 seconds of time). In some implementations, the values of the waterfall data at each instant of time is averaged over the channels.

The foreground extraction manager 240 then generates separate background data 320 and foreground data 330. In some implementations, the separation is performed such that a sum of the background data 320 and the foreground data 330 is equal to the sinusoid data 310.

The foreground extraction manager 240 then inputs the background data into the wear check manager 241 to determine whether the sinusoid data 310 was generated by a user wearing a wristband or is simply noise. In the latter case, the process 300 terminates without identifying a gesture. In the former case, the CNN 340 takes as input the foreground data 330 and performs a classification operation to identify a gesture 350 being formed by the user.

FIG. 4 is a flow chart depicting an example method 400 of identifying a gesture from small wrist movements. The method 400 may be performed by software constructs described in connection with FIG. 2, which reside in memory 226 of the user device computer 220 and are run by the set of processing units 224 or may be performed by software constructs which reside in memory of the gesture recognition circuitry 220.

At 402, the EM radiation manager 230 receives reflected electromagnetic radiation from a set of receiving antennae (e.g., receiving antennae 192(1-3) of FIG. 1C), each of the set of receiving antennae being configured to receive reflected electromagnetic radiation reflected from a portion of an arm in response to the transmitted electromagnetic radiation being incident on the portion of the arm from a transmitting antenna (e.g., transmitting antenna 194). In some implementations, the transmitting antenna and the set of receiving antennae are disposed within a band worn around a wrist of the arm (e.g., wristband 110 of FIG. 1A). In some implementations, the transmitted electromagnetic radiation includes a FMCW signal. In some implementations, the FMCW signal is a chirped, millimeter-wave signal transmitted in a series of bursts, each of the series of bursts including a set of chirps, each of the set of chirps including a beginning frequency and an ending frequency. In some implementations, the set of receiving antennae are further configured to receive electromagnetic radiation reflected from an exterior of the wrist, the electromagnetic radiation reflected from an exterior of the wrist being superposed with the reflected electromagnetic radiation reflected from the interior of the wrist. In some implementations, the superposition of the electromagnetic radiation reflected from an exterior of the wrist and the reflected electromagnetic radiation reflected from the interior of the wrist are represented by an infinite sum of sinusoids as received by controlling circuitry of an electronic apparatus. In some implementations, the method 400 includes averaging values of representations of the electromagnetic radiation from each of the set of receiving antennae as the reflected electromagnetic radiation. In some implementations, a power of the transmitted electromagnetic radiation is less than 10 mW. In some implementations, there are at least three receiving antennae in the set of receiving antennae.

At 404, the machine learning manager 250 performs a classification operation on the reflected electromagnetic radiation to produce a classification result (e.g., ML classification data 256), the classification result indicating a gesture performed by the user as the electromagnetic radiation is incident on the portion of the arm. In some implementations, the method 400 includes extracting, from the reflected electromagnetic radiation, a background component (e.g., background data 242) and a foreground component (e.g., foreground data 243); and determining whether the set of receiving antennae are activated based on the background component. In some implementations, the method 400 further includes inputting values of a representation of the background component into a first convolutional neural network (e.g., wear check manager 241); and inputting values of a representation of the foreground component into a second convolutional neural network (e.g., machine learning manager 250).

Figure 5:
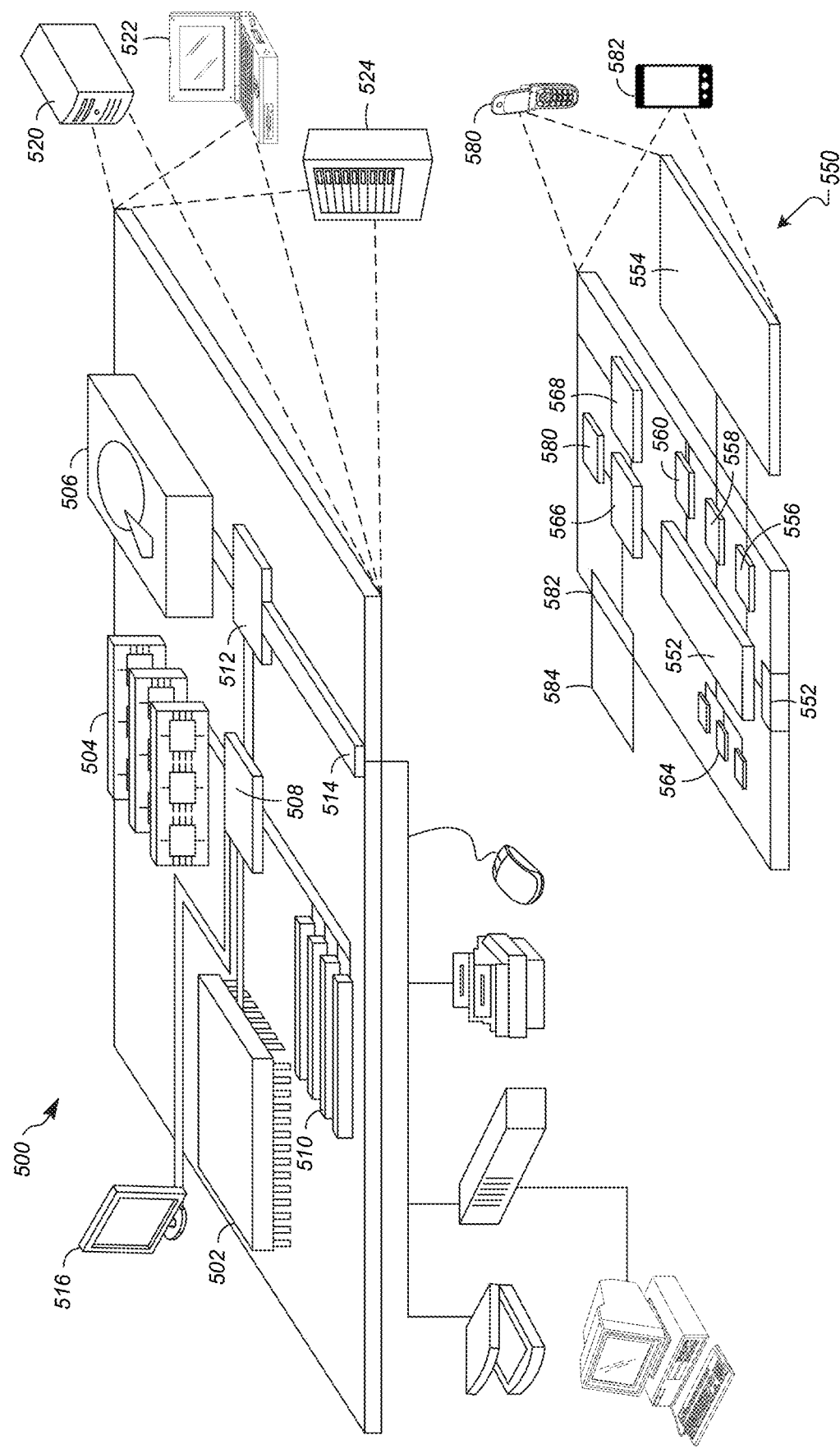
FIG. 5 illustrates an example of a computer device and a mobile computer device that can be used with circuits described here.

FIG. 5 illustrates an example of a generic computer device 500 and a generic mobile computer device 550, which may be used with the techniques described here.

As shown in FIG. 5, computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 450, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Returning to FIG. 2, in some implementations, the memory 226 can be any type of memory such as a random-access memory, a disk drive memory, flash memory, and/or so forth. In some implementations, the memory 226 can be implemented as more than one memory component (e.g., more than one RAM component or disk drive memory) associated with the components of the gesture recognition circuitry 220. In some implementations, the memory 226 can be a database memory. In some implementations, the memory 226 can be, or can include, a non-local memory. For example, the memory 226 can be, or can include, a memory shared by multiple devices (not shown). In some implementations, the memory 226 can be associated with a server device (not shown) within a network and configured to serve the components of the gesture recognition circuitry 220.

The components (e.g., modules, processing units 224) of the compression computer 120 can be configured to operate based on one or more platforms (e.g., one or more similar or different platforms) that can include one or more types of hardware, software, firmware, operating systems, runtime libraries, and/or so forth. In some implementations, the components of the gesture recognition circuitry 220 can be configured to operate within a cluster of devices (e.g., a server farm). In such an implementation, the functionality and processing of the components of the gesture recognition circuitry 220 can be distributed to several devices of the cluster of devices.

The components of the gesture recognition circuitry 220 can be, or can include, any type of hardware and/or software configured to process attributes. In some implementations, one or more portions of the components shown in the components of the gesture recognition circuitry 220 in FIG. 2 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the gesture recognition circuitry 220 can be, or can include, a software module configured for execution by at least one processor (not shown). In some implementations, the functionality of the components can be included in different modules and/or different components than those shown in FIG. 3.

Although not shown, in some implementations, the components of the gesture recognition circuitry 220 (or portions thereof) can be configured to operate within, for example, a data center (e.g., a cloud computing environment), a computer system, one or more server/host devices, and/or so forth. In some implementations, the components of the gesture recognition circuitry 220 (or portions thereof) can be configured to operate within a network. Thus, the components of the gesture recognition circuitry 220 (or portions thereof) can be configured to function within various types of network environments that can include one or more devices and/or one or more server devices. For example, a network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the computer 120 can be, or can include, processors configured to process instructions stored in a memory. For example, the EM radiation manager 230 (and/or a portion thereof), the foreground extraction manager 240 (and/or a portion thereof), and the machine learning manager 250 (and/or a portion thereof) can be a combination of a processor and a memory configured to execute instructions related to a process to implement one or more functions.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A system, comprising:
a wearable device configured to be worn along a portion of an arm, the wearable device including:
a transmitting antenna configured to transmit a pulse of transmitted electromagnetic radiation toward the portion of the arm, and
a receiving antenna configured to receive reflected electromagnetic radiation reflected from the portion of the arm in response to the transmitted electromagnetic radiation being incident on the portion of the arm;
wherein the reflected electromagnetic radiation includes a background component and a foreground component, the background component indicating whether the receiving antenna is activated for determining a gesture, the foreground component indicating the gesture is performed in response to the receiving antenna being activated.

2. The system as in claim 1, wherein the wearable device is configured to:
perform a classification operation to produce a classification result, the classification result indicating whether the receiving antenna is activated, and the gesture in response to the receiving antenna being activated.

3. The system as in claim 2, wherein the classification operation further comprises:
inputting values of a representation of the background component into a first convolutional neural network; and
inputting values of a representation of the foreground component into a second convolutional neural network.

4. The system as in claim 3, wherein the first convolutional neural network includes two convolutional layers and one hidden layer.

5. The system as in claim 2, wherein the wearable device is further configured to:
in response to the background component indicating that the receiving antenna is not activated, terminating the classification operation.

6. The system as in claim 1, wherein the receiving antenna configured to receive the reflected electromagnetic radiation reflected from the portion of the arm is further configured to:
obtain sinusoid data from the reflected electromagnetic radiation over channels, wherein the sinusoid data takes a form of waterfall data averaged over the channels.

7. The system as in claim 6, wherein a sum of the foreground component and the background component is equal to the sinusoid data.

8. A method, comprising:
receiving reflected electromagnetic radiation from a receiving antenna, the receiving antenna being configured to receive the reflected electromagnetic radiation reflected from a wrist in response to transmitted electromagnetic radiation being incident on the wrist from a transmitting antenna and receive electromagnetic radiation reflected from an exterior of the wrist; and
extracting, from the reflected electromagnetic radiation, a background component and a foreground component, the background component indicating whether the receiving antenna is activated for determining a gesture, the foreground component indicating the gesture is performed in response to the receiving antenna being activated.

9. The method as in claim 8, further comprising:
performing a classification operation to produce a classification result, the classification result indicating whether the receiving antenna is activated, and the gesture in response to the receiving antenna being activated.

10. The method as in claim 9, wherein performing the classification operation includes:
inputting values of a representation of the background component into a first convolutional neural network; and
inputting values of a representation of the foreground component into a second convolutional neural network.

11. The method as in claim 10, wherein the first convolutional neural network includes two convolutional layers and one hidden layer.

12. The method as in claim 9, further comprising:
in response to determining that the receiving antenna is not activated, terminating the classification operation.

13. The method as in claim 8, wherein receiving the reflected electromagnetic radiation from the receiving antenna includes:
obtaining sinusoid data from the reflected electromagnetic radiation over channels, wherein the sinusoid data takes a form of waterfall data averaged over the channels.

14. The method as in claim 13, wherein a sum of the foreground component and the background component is equal to the sinusoid data.

15. A computer program product comprising a nontransitive storage medium, the computer program product including code that, when executed by processing circuitry, causes the processing circuitry to perform a method, the method comprising:
receiving reflected electromagnetic radiation from a receiving antenna, the receiving antenna being configured to receive the reflected electromagnetic radiation reflected from a wrist in response to transmitted electromagnetic radiation being incident on the wrist from a transmitting antenna and receive electromagnetic radiation reflected from an exterior of the wrist; and
extracting, from the reflected electromagnetic radiation, a background component and a foreground component, the background component indicating whether the receiving antenna is activated for determining a gesture, the foreground component indicating the gesture is performed in response to the receiving antenna being activated.

16. The computer program product as in claim 15, wherein the method further comprises:
performing a classification operation to produce a classification result, the classification result indicating whether the receiving antenna is activated, and the gesture in response to the receiving antenna being activated.

17. The computer program product as in claim 16, wherein performing the classification operation includes:
inputting values of a representation of the background component into a first convolutional neural network; and
inputting values of a representation of the foreground component into a second convolutional neural network.

18. The computer program product as in claim 17, wherein the first convolutional neural network includes two convolutional layers and one hidden layer.

19. The computer program product as in claim 16, wherein performing the classification operation further includes:
in response to determining that the receiving antenna is not activated, terminating the classification operation.

20. The computer program product as in claim 15, wherein receiving the reflected electromagnetic radiation from the receiving antenna includes:
  obtaining sinusoid data from the reflected electromagnetic radiation over channels, wherein the sinusoid data takes a form of waterfall data averaged over the channels.

* * * * *